United States Patent
Rachlin

(10) Patent No.: US 10,248,463 B2
(45) Date of Patent: Apr. 2, 2019

(54) APPARATUS AND METHOD FOR MANAGING A PLURALITY OF THREADS IN AN OPERATING SYSTEM

(71) Applicant: Honeywell International, Inc., Morristown, NJ (US)

(72) Inventor: Elliott Rachlin, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 547 days.

(21) Appl. No.: 14/622,465

(22) Filed: Feb. 13, 2015

(65) Prior Publication Data

US 2016/0239345 A1 Aug. 18, 2016

(51) Int. Cl.
*G06F 9/48* (2006.01)
*G06F 9/50* (2006.01)

(52) U.S. Cl.
CPC .......... *G06F 9/5038* (2013.01); *G06F 9/4881* (2013.01)

(58) Field of Classification Search
CPC ..... G06F 9/4843; G06F 9/4881; G06F 9/5038
USPC ........................................ 718/103, 107, 108
See application file for complete search history.

(56) References Cited

U.S. PATENT DOCUMENTS

| | | | |
|---|---|---|---|
| 4,644,456 A * | 2/1987 | Lydell | F21V 15/02 362/376 |
| 5,220,653 A | 6/1993 | Miro | |
| 5,630,128 A * | 5/1997 | Farrell | G06F 9/4881 718/103 |
| 5,970,236 A | 10/1999 | Galloway et al. | |
| 6,212,544 B1 * | 4/2001 | Borkenhagen | G06F 9/3009 712/E9.032 |
| 6,442,634 B2 * | 8/2002 | Bronson | G06F 13/4027 710/112 |
| 6,779,182 B1 * | 8/2004 | Zolnowsky | G06F 9/4843 709/203 |
| 7,047,321 B1 * | 5/2006 | Endo | G06F 9/4812 707/999.2 |
| 7,234,139 B1 * | 6/2007 | Feinberg | G06F 9/45504 718/1 |

(Continued)

FOREIGN PATENT DOCUMENTS

EP 04188501 6/1992

OTHER PUBLICATIONS

Rachlin, "System and Method for Endian Correction of Complex Data Structures in Heterogeneous Systems", U.S. Appl. No. 14/604,346, filed Jan. 23, 2015, 47 pgs.

(Continued)

*Primary Examiner* — Andrew M. Lyons

(57) ABSTRACT

A method includes using processing circuitry and at least one memory configured to store a plurality of threads. The method includes providing an environment associated with an operating system to execute one or more threads of the plurality of threads. The environment includes a plurality of virtual priorities and a plurality of actual priorities. Each of the plurality of threads is allowed to select a virtual priority of the plurality of virtual priorities. The method also includes associating an actual priority of the plurality of actual priorities to one of the plurality of threads based on the plurality of virtual priorities assigned to the plurality of threads. The method also includes executing the one of the plurality of threads associated with the actual priority.

20 Claims, 4 Drawing Sheets

(56) References Cited

U.S. PATENT DOCUMENTS

| | | | | |
|---|---|---|---|---|
| 7,509,671 B1* | 3/2009 | Bedell | G06F 9/5038 | 718/102 |
| 7,590,982 B1* | 9/2009 | Weissman | G06F 9/4812 | 710/260 |
| 7,748,001 B2* | 6/2010 | Burns | G06F 9/3851 | 710/240 |
| 8,516,024 B2* | 8/2013 | Marr | | 707/899 |
| 8,635,621 B2* | 1/2014 | Levitan | G06F 9/4881 | 712/208 |
| 2004/0073910 A1* | 4/2004 | Hokenek | G06F 9/30101 | 719/310 |
| 2004/0172631 A1* | 9/2004 | Howard | G06F 9/30087 | 718/100 |
| 2005/0216635 A1* | 9/2005 | Nishimura | G06F 13/24 | 710/260 |
| 2006/0031838 A1* | 2/2006 | Chrabieh | G06F 9/4881 | 718/100 |
| 2006/0059485 A1* | 3/2006 | Onufryk | G06F 9/4881 | 718/100 |
| 2006/0075404 A1* | 4/2006 | Rosu | G06F 9/4881 | 718/100 |
| 2006/0184946 A1* | 8/2006 | Bishop | G06F 9/30101 | 718/102 |
| 2007/0198980 A1* | 8/2007 | Kwon | G06F 9/524 | 718/100 |
| 2008/0028197 A1 | 1/2008 | Sawai | | |
| 2009/0138682 A1* | 5/2009 | Capps, Jr. | G06F 9/30101 | 712/220 |
| 2010/0050178 A1* | 2/2010 | Levitan | G06F 9/4881 | 718/103 |
| 2010/0077399 A1* | 3/2010 | Plondke | G06F 9/4818 | 718/103 |
| 2010/0229179 A1* | 9/2010 | Moore | G06F 9/4881 | 718/104 |
| 2011/0302588 A1* | 12/2011 | Cornwell | G06F 9/4881 | 718/103 |
| 2012/0023502 A1* | 1/2012 | Marr | G06F 9/4881 | 718/103 |
| 2013/0111489 A1* | 5/2013 | Glew | G06F 9/4881 | 718/103 |
| 2014/0019710 A1 | 1/2014 | Kataoka et al. | | |
| 2014/0164662 A1* | 6/2014 | van Schaik | G06F 13/26 | 710/265 |
| 2014/0282507 A1* | 9/2014 | Plondke | G06F 9/45545 | 718/1 |
| 2014/0310723 A1* | 10/2014 | Yamauchi | G06F 9/4812 | 718/107 |
| 2014/0373021 A1 | 12/2014 | Teixeira et al. | | |
| 2015/0135183 A1* | 5/2015 | Kipp | G06F 9/46 | 718/103 |

OTHER PUBLICATIONS

Extended European Search Report issued for EP 16154359.0 dated Jun. 23, 2016, 7 pgs.
Partial European Search Report dated Aug. 17, 2016 in connection with European Patent Application No. EP 16 15 1386.

* cited by examiner

APPARATUS AND METHOD FOR MANAGING A PLURALITY OF THREADS IN AN OPERATING SYSTEM

TECHNICAL FIELD

This disclosure relates generally to computer operating systems. More specifically, this disclosure relates to an apparatus and method for managing a plurality of threads in an operating system.

BACKGROUND

Some operating systems, such as a non-real time operating system, provide for multithreaded applications. These systems do not have a large number of priority levels or strict adherence to running a higher-priority thread over a lower-priority thread.

Some operating systems have a maximum of one hundred priority levels. Other operating systems limit an application designer to six priority levels within a single process, and no more than thirty-two priority levels across the entire system. The operating system uses the priorities as more of a suggestion than a requirement. These operating systems may choose to run lower-priority threads to avoid thread starvation and in pursuit of fairness.

For applications that need a much broader range of priority levels and strict adherence, some operating systems use user-mode scheduling in 64-bit systems. User-mode scheduling is used to host soft real-time applications. Soft real-time refers to the absence of strict time deadlines coupled with the presence of a priority based thread scheduling system.

SUMMARY

This disclosure provides an apparatus and method for managing a plurality of threads in an operating system.

In a first embodiment, a method includes providing an environment associated with an operating system to execute one or more threads of the plurality of threads. The environment includes a plurality of virtual priorities and a plurality of actual priorities. The method also includes assigning (via a "thread selection algorithm") the plurality of actual priorities to the plurality of threads. Each of the plurality of threads selects a virtual priority of the plurality of virtual priorities. The method also includes associating an actual priority of the plurality of actual priorities to one of the plurality of threads based on the plurality of virtual priorities assigned to the plurality of threads. The method also includes executing the one of the plurality of threads associated with the actual priority.

In a second embodiment, an apparatus includes at least one memory configured to store a plurality of threads and processing circuitry. The processing circuitry is configured to provide an environment associated with an operating system to execute one or more threads of the plurality of threads. The environment includes a plurality of virtual priorities and a plurality of actual priorities. Each of the plurality of threads selects a virtual priority of the plurality of virtual priorities. The processing circuitry is also configured to associate an actual priority of the plurality of actual priorities to one of the plurality of threads based on the plurality of virtual priorities assigned to the plurality of threads. The processing circuitry is also configured to execute the one of the plurality of threads associated with the actual priority.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
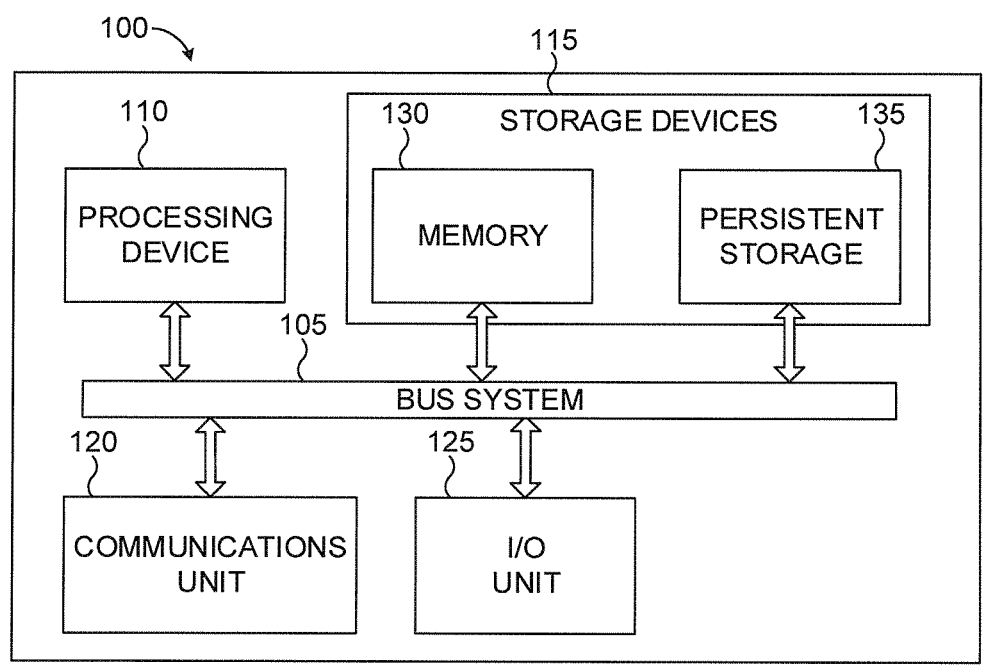
FIG. 1 illustrates a computing device for implementing a scheduling system in an operating system according to this disclosure.

FIG. 1 illustrates a computing device 100 for implementing a scheduling system in an operating system according to this disclosure. The computing device 100 could, for example, represent a controller, processor, processing circuitry, general computer, or any electronic device.

As shown in FIG. 1, the computing device 100 includes a bus system 105, which supports communication between at least one processing device 110, at least one storage device 115, at least one communications unit 120, and at least one input/output (I/O) unit 125.

The processing device 110 executes instructions that may be loaded into a memory 130. The processing device 110 may include any suitable number(s) and type(s) of processors or other devices in any suitable arrangement. Example types of processing devices 110 include microprocessors, microcontrollers, digital signal processors, field programmable gate arrays, application specific integrated circuits, processing circuitry, and discrete circuitry.

The memory 130 and a persistent storage 135 are examples of storage devices 115, which represent any structure(s) capable of storing and facilitating retrieval of information (such as data, program code, and/or other suitable information on a temporary or permanent basis). The memory 130 may represent a random access memory or any other suitable volatile or non-volatile storage device(s). The persistent storage 135 may contain one or more components or devices supporting longer-term storage of data, such as a ready only memory, hard drive, Flash memory, or optical disc. In accordance with this disclosure, the memory 130 and the persistent storage 135 may be configured to store instructions associated with implementing a scheduling system in an operating system.

The communications unit 120 supports communications with other systems or devices. For example, the communications unit 120 could include a network interface card or a wireless transceiver facilitating communications over a network. The communications unit 120 may support communications through any suitable physical or wireless communication link(s).

The I/O unit 125 allows for input and output of data. For example, the I/O unit 125 may provide a connection for user input through a keyboard, mouse, keypad, touchscreen, or other suitable input device. The I/O unit 125 may also send output to a display, printer, or other suitable output device.

Although FIG. 1 illustrates one example of a computing device 100 for implementing a scheduler system in an operating system, various changes may be made to FIG. 1. For example, various components in FIG. 1 could be combined, further subdivided, or omitted and additional components could be added according to particular needs. Also, computing devices can come in a wide variety of configurations, and FIG. 1 does not limit this disclosure to any particular configuration of computing device.

Figure 2:
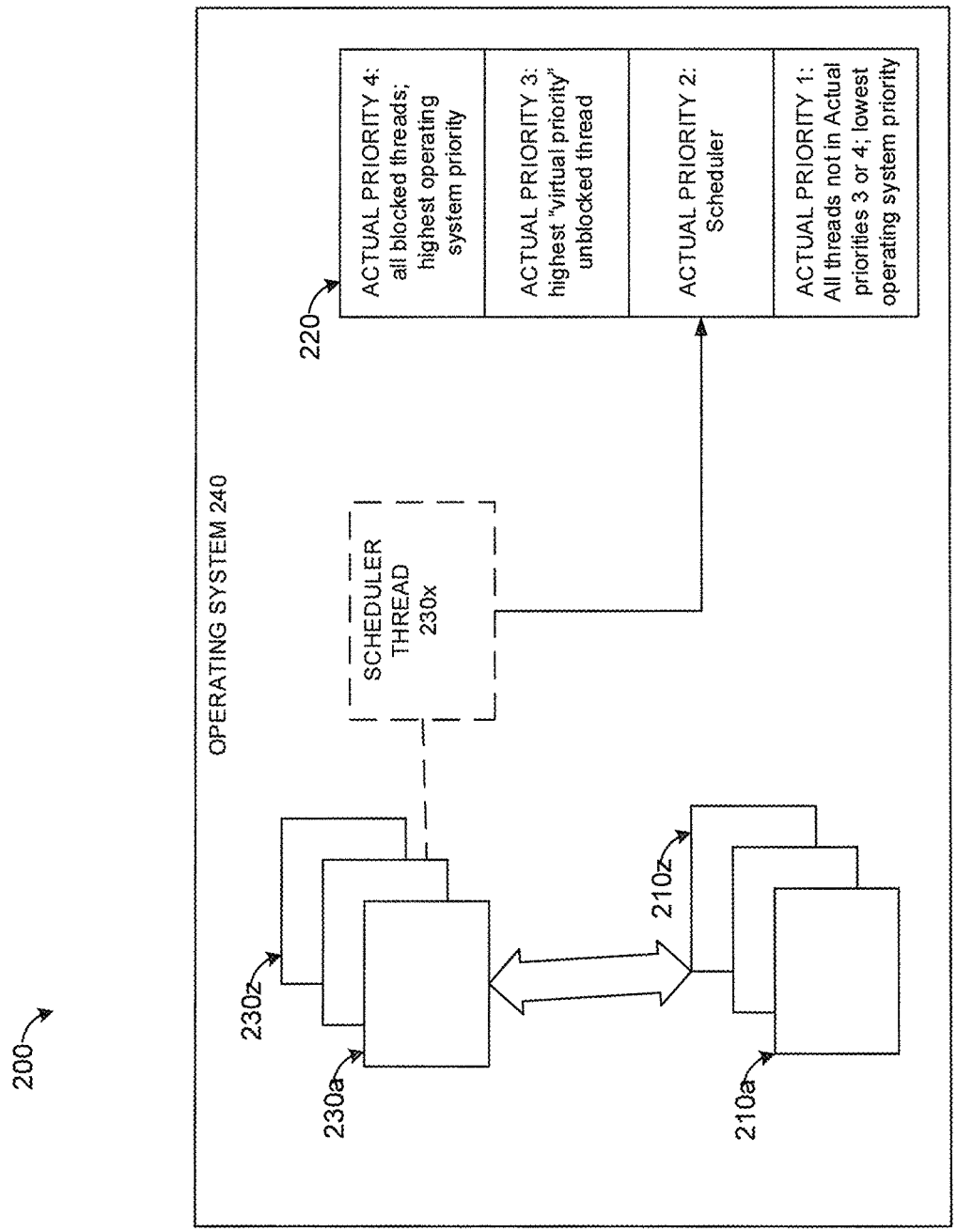
FIG. 2 illustrates a scheduler system in accordance with an embodiment of this disclosure.

FIG. 2 illustrates a scheduler system 200 in accordance with an embodiment of this disclosure. The scheduler system 200 can be implemented in computing device 100 using processing device 110 and storage devices 115 as shown in FIG. 1. The embodiment of the scheduling system 200 in FIG. 2 is for illustration only. Scheduling systems come in a wide variety of configurations, and FIG. 2 does not limit the scope of this disclosure to any particular implementation of a scheduling system.

As shown in FIG. 2, the scheduling system 200 may include virtual priorities 210a-210z (or collectively referred to herein as virtual priorities 210), actual priorities 220, threads 230a-230z (or collectively referred to herein as threads 230), and operating system 240. Actual priorities 220 are priorities known to the operating system and virtual priorities 210 are priorities known to the threads 230. In an example embodiment, each thread 230 may not know that the priority assigned is a virtual priority. In other words, the thread only knows of a "priority"; whether the priority is virtual or actual is unknown to the thread.

A thread can be referred to as a thread of execution or a task. Each thread 230 can be executed by a processing device 110 as shown in FIG. 1. Threads 230 can be divided or split parts of a program and are simultaneously (or pseudo-simultaneously) running or executing threads. As used herein, the term "running" a thread is equivalent to "executing" a thread. Every thread 230 has a priority assigned to it. Threads 230 may be scheduled for execution based on their priority. Even though threads 230 are executing within the runtime of the operating system 240, all threads 230 are assigned processor time slices by the operating system 240. Each thread 230 selects its own priority, which is a virtual priority 210.

The scheduling algorithm used to determine the order in which the threads 230 are executed can vary with each operating system. In an embodiment, the scheduling algorithm can be defined as a thread and referred to as a thread selection algorithm, scheduler thread 230x or scheduler.

In one embodiment of the operating system 240, the thread 230 with the highest priority (of the threads 230 that are executable) is scheduled to run first. If multiple threads 230 with the same priority are all available, the scheduler thread 230x cycles through the threads 230 at that priority, giving each thread a fixed time slice in which to execute. As long as a thread 230 with a higher priority is available to run, lower priority threads 230 do not get to execute. When there are no more runnable threads 230 at a given priority, the scheduler thread 230x moves to the next lower priority and schedules the threads at that priority for execution. If a higher priority thread becomes runnable, the lower priority thread is preempted and the higher priority thread is allowed to execute once again.

Virtual priorities 210 are selected by the threads 230 and actual priorities 220 are associated with the operating system 240 and the threads 230. There can exist an unlimited number of virtual priorities 210 while many operating systems include a limited number of actual priorities 220. In one example embodiment, there is a range of virtual priorities 210 having priority values from 255 (highest priority) to 0 (lowest priority). These virtual priorities 210 can be selected by threads 230 at initialization (from a threads list) and can be dynamically changed by threads 230 at runtime.

Actual priorities 220 are priorities provided by the operating system 240. In an example embodiment, there is a range of actual priorities 220 having priority values from 4 (highest priority) to 1 (lowest priority).

In an embodiment, actual priority 4 can be associated with all threads that are blocked for I/O, semaphores, waits, timeouts, and the like. In an example, the threads are assigned to actual priority 4 when the threads are about to be blocked, blocked, or just completed being blocked. The threads that are blocked for I/O are blocked from execution during an input or output function.

In this embodiment, actual priority 3 can be assigned to a single thread with the highest virtual priority. In an example embodiment, the thread in actual priority 3 is not blocked and does not include an inhibit_interrupt function or and inhibit_task_scheduling function. Threads may be associated with actual priority 3 by a scheduler thread 230x when selected to run.

In this embodiment, actual priority 2 can be assigned to the scheduler thread 230x. In an example, the scheduler thread 230x can become the highest active actual priority thread in response to a prior thread associated with actual priority 3 being blocked for I/O, semaphore, waits, timeouts, and the like.

In this embodiment, actual priority 1 can be assigned to all threads that are not in actual priority 4, 3, or 2. These threads are ready to run but have not been selected by the "thread selection algorithm" to be run at the present time.

Although FIG. 2 illustrates one example of the scheduling system 200, various changes may be made to FIG. 2. For example, the ranges of the number of actual and virtual priorities in FIG. 2 are examples only. Other embodiments could include other ranges and values.

Figure 3:
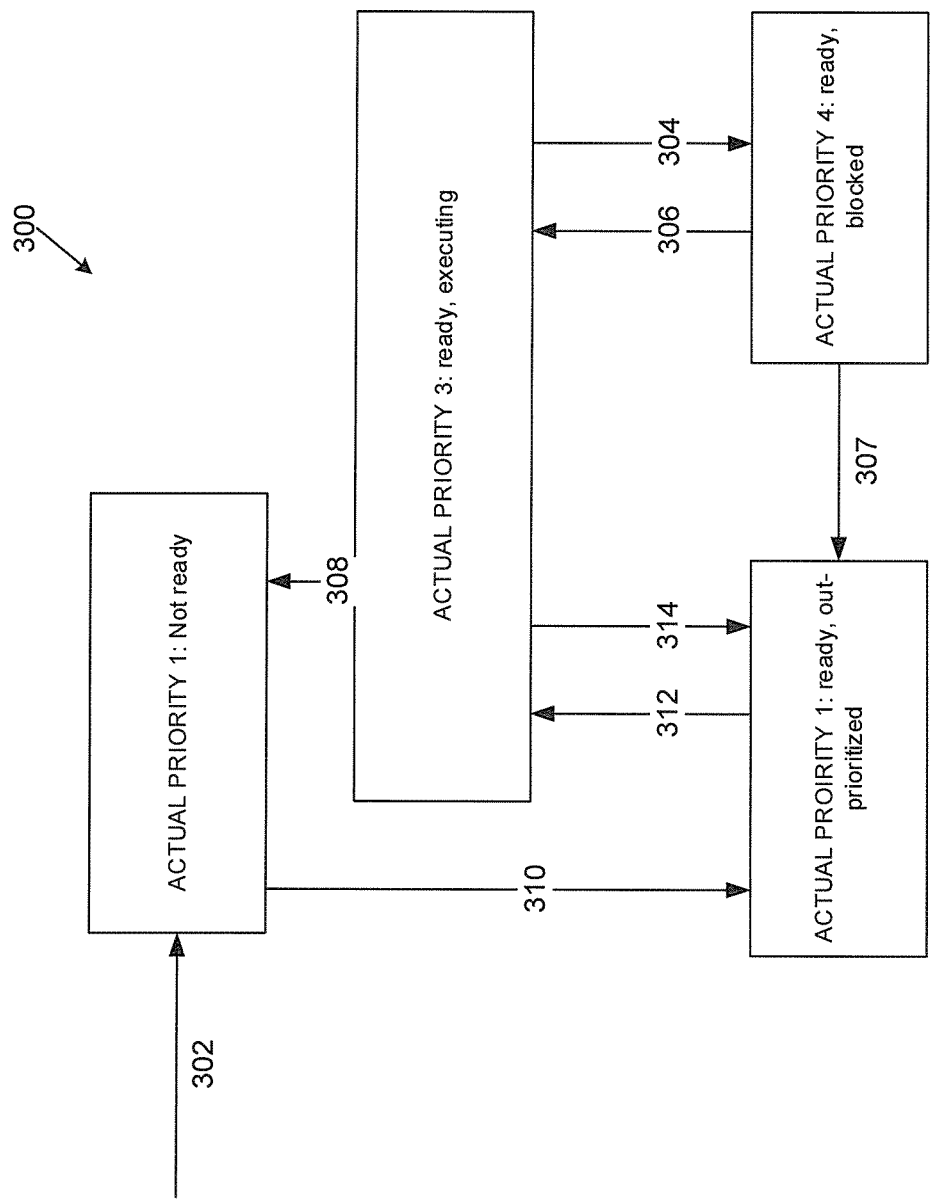
FIG. 3 illustrates a diagram with different transitions and states for threads in accordance with an embodiment of this disclosure.

FIG. 3 illustrates a diagram 300 with different transitions and states for threads (such as the threads 230) in accordance with an embodiment of this disclosure. The embodiment of the diagram 300 in FIG. 3 is for illustration only. The diagram 300 could be implemented in any suitable device and in any suitable system.

In an embodiment, at transition 302, on system startup or initialization, all threads are at actual priority 1. The scheduler thread is assigned to actual priority 2. The scheduler thread automatically runs and examines all the threads, selecting one to run. The selected thread is moved to actual priority 3. The selected thread (now at actual priority 3) runs, and the scheduler thread, now out-prioritized, is removed from execution at the "bottom" of its selection loop. The "bottom" can be the end or close to the end of the code of the thread.

At transition 304, when the thread at actual priority 3 prepares to block for I/O or any other reason, it moves itself up to actual priority 4 where the task blocks and waits until the cause of blocking is removed. In response, the scheduler thread at actual priority 2 continues execution from the bottom of its scheduling loop. The scheduler thread selects another thread from those at actual priority 1 (based on highest virtual priority) and sets the actual priority of the selected thread to actual priority 3. The selected thread runs, and the scheduler thread, now out-prioritized, loses the CPU at the "bottom" of its selection loop.

In one or more embodiments, the execution of the scheduler thread is intentionally non-re-entrant and is protected from multiple thread execution by the use of a "critical section" mechanism of the operating system.

In one or more embodiments, the thread associated with actual priority 3 (i.e., the currently running thread) calls the "Inhibit_Interrupts" function or "Inhibit_Task_Scheduling" function. Interrupts are asynchronous breaks in program flow that occur as a result of events outside the running program. The "Inhibit_Interrupts" function can prevent an interrupt from occurring. Likewise, the "Inhibit_Task_Scheduling" function can prevent the scheduling thread from rescheduling or reassigning the executing thread associated with actual priority 3. When the thread at actual priority 3 calls either of the two above-named functions, the ID of the thread associated with actual priority 3 is recorded so that when the scheduler thread next runs, the scheduler thread may only select the thread associated with actual priority 3 to execute. This thread does not terminate its execution on the processor. This thread remains associated with actual priority 3.

In one example embodiment, a thread associated with actual priority 3 (i.e., the currently running thread) may call the "Enable_Interrupts" function or "Enable_Task_Scheduling" function. When the thread associated with actual priority 3 calls either of the two above-named functions, the record of which thread has interrupts or task scheduling inhibited is cleared, thus allowing the scheduler thread to execute the thread selection algorithm in order to select another thread to run. This is effectively a "Yield" call. To effect this yield, the calling thread may perform a minimal "sleep" operation in order to trigger a new execution of the scheduler thread. Triggering the new execution of the scheduler thread can be achieved by setting a flag for the scheduler thread, then putting the scheduler thread to sleep waiting on a semaphore. The scheduler thread will see the semaphore and signal a new thread to execute. The new execution may wait until after determining a (possibly) new thread to run and adjusting the actual priority of both the semaphored (newly awakened) thread and the newly selected thread (if they are different) such that the now highest virtual priority thread is associated with actual priority 3. The thread selected to be associated with actual priority 3 may begin to run and the unselected thread is associated with actual priority 1, effectively un-scheduled.

In one example embodiment, a thread associated with actual priority 4 can become unblocked (wakes from sleep, receives event, signal or semaphore, and the like). The thread associated with actual priority 4 may, if having a high actual priority, begin to execute again. When the just-awakened thread begins to execute code occurring immediately after the code that put the thread to sleep or otherwise caused the thread to block, the thread executes the thread selection algorithm.

The just-awakened thread (at actual priority 4) compares its virtual priority with the virtual priority of the thread associated with actual priority 3. If the virtual priority of the thread associated with actual priority 4 is higher than that of the thread associated with actual priority 3 (or if there is no thread currently at actual priority 3) then the just-awakened thread associates itself with actual priority 3 at transition 306. When the thread at actual priority 4 associates with actual priority 3, the prior associated thread of actual priority 3 is associated with actual priority 1, thus effectively suspending the previous thread at actual priority 3. If the virtual priority of the just-awakened thread is lower than the virtual priority of the thread currently associated with actual priority 3, then the just-awakened thread associated itself with actual priority 1 at transition 307, thus effectively un-scheduling itself.

In various embodiments, a thread can terminate by returning to a thread startup function. When a thread terminates, it associates itself with actual priority 1 and also marks itself as "not ready to run" at transition 308. This causes the scheduler thread to ignore it. In an example embodiment, the terminating thread may not really cease to exist as a thread. Instead, the thread does continue to exist as a thread, awaiting an "Establish_Task" call to be made which restarts the execution of the thread at the initial entry point of the thread.

In various embodiments, a thread is started with a call to "Establish_Task". In response to an "Establish_Task" call, a thread is made "ready to run" and associated with actual priority 1 if it is not already at actual priority 1 at transition 310. The thread may then be scheduled by the thread selection algorithm at transition 312 if its virtual priority becomes high enough to out-prioritize all other non-blocked, ready threads. If the thread is associated with actual priority 3 and then becomes out-prioritized, the thread may be associated with actual priority 1 again and be ready to run at transition 314.

Although FIG. 3 illustrates one example of a diagram 300 with different transitions and states for threads, various changes may be made to FIG. 3. For example, various transitions and states in FIG. 3 could overlap, occur in parallel, occur in a different order, or occur multiple times.

Figure 4:
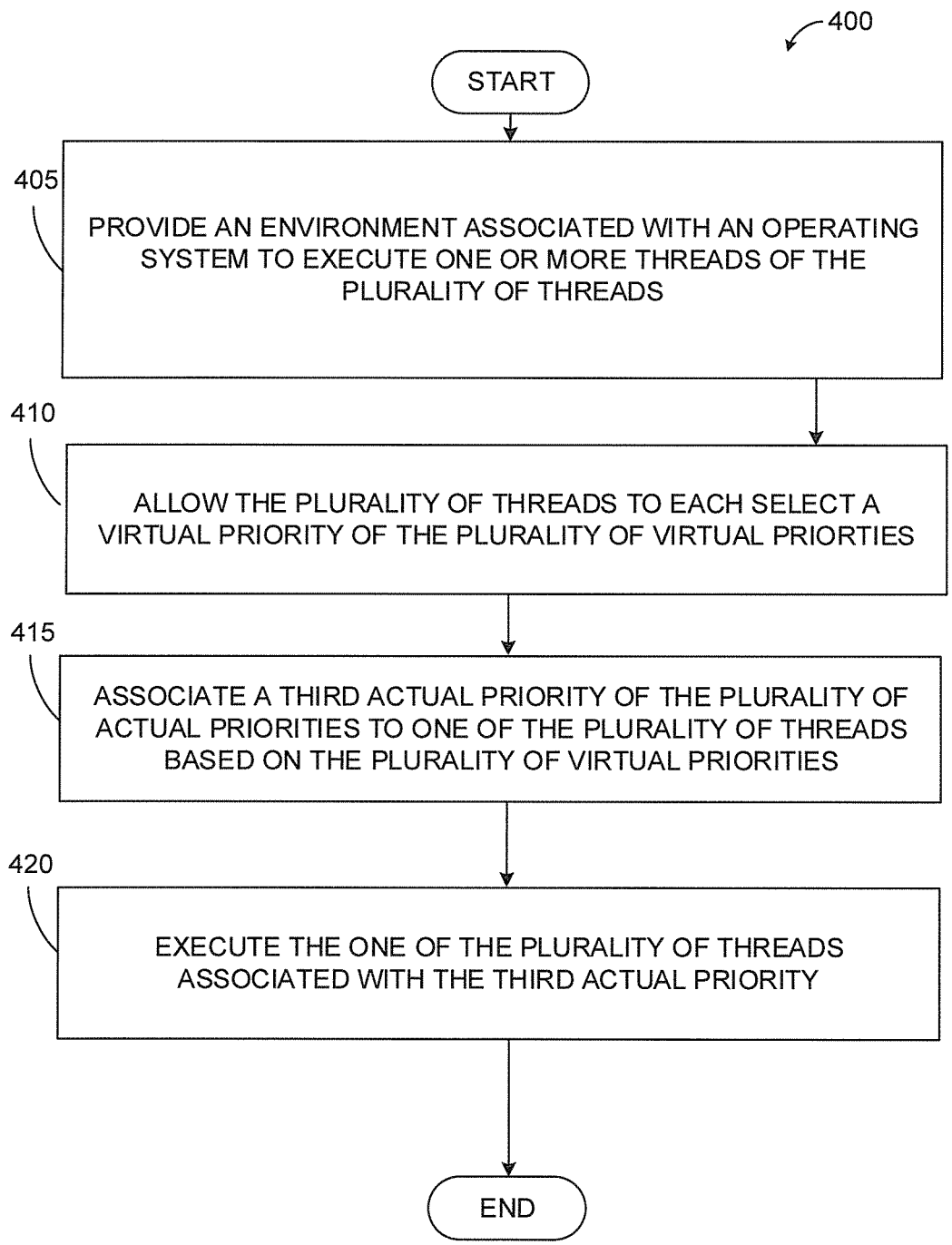
FIG. 4 illustrates an example method for managing a plurality of threads according to this disclosure.

FIG. 4 illustrates an example method 400 for managing a plurality of threads according to this disclosure. For ease of explanation, the method 400 is described as being performed by the computing device 100 of FIG. 1. However, the method 400 could be used by any suitable device and in any suitable system.

As shown in FIG. 4, at operation 405, a processing device or processing circuitry provides an environment associated with an operating system to execute one or more threads of the plurality of threads. The environment can be a part of the operating system configured to control the priorities of threads. The environment includes a plurality of virtual priorities and a plurality of actual priorities.

At operation 410, the device allows the plurality of threads to each select a virtual priority of the plurality of virtual priorities. This assignment can be done at initialization of the operating system. In one or more example embodiments, the device can also associate the plurality of threads with a first actual priority of the plurality of actual priorities. This first actual priority can be actual priority 1 as described herein. In an example embodiment, each thread is assigned a virtual priority.

At operation 415, the device associates a third actual priority of the plurality of actual priorities to one of the plurality of threads based on the plurality of virtual priorities assigned to the plurality of threads. This third actual priority can be actual priority 3 as described herein. In an example embodiment, associating the third actual priority includes the device identifying a thread of the plurality of threads with a highest virtual priority and associating the third actual priority to the thread with the highest virtual priority.

At operation 420, the device executes the one of the plurality of threads associated with the third actual priority.

In various example embodiments, the method 400 can also include associating a scheduler thread with a second actual priority. The scheduler thread can control the associating the plurality of actual priorities with the plurality of threads.

In various example embodiments, the method 400 can also include associating the thread selection algorithm with the third actual priority when the third actual priority is unassociated and executing the scheduler thread.

In various example embodiments, the method 400 can also include calling the scheduler thread from the executed thread associated with the execution actual priority, associating the scheduler thread with the third priority, and executing the scheduler thread selection algorithm.

In various example embodiments, the method 400 can also include associating one or more threads of the plurality of threads with a fourth actual priority. The one or more threads can be blocked from execution during an input or output function.

In various example embodiments, the method 400 can also include, responsive to completion of the input or output function, associating a thread with a highest virtual priority of the one or more threads with the third actual priority.

In an example embodiment, the executed thread may call an inhibit interrupts function or an inhibit task scheduling function. In another example embodiment, the executed thread may call an enable interrupts function or an enable task scheduling function.

In an example embodiment, the method 400 can also include, responsive to a termination of the executed thread, associating the executed thread with the first actual priority.

Although FIG. 4 illustrates one example of a method 400 for managing a plurality of threads, various changes may be made to FIG. 4. For example, while shown as a series of steps, various steps in FIG. 4 could overlap, occur in parallel, occur in a different order, or occur multiple times.

In one or more example embodiments, a scheduler thread runs (at actual priority 2, to select a thread) whenever there is no running task at actual priority 3, and there is no recently wakened task at actual priority 4.

In one or more example embodiments, a thread selection algorithm runs (at actual priority 3, to select a thread) whenever: the (one and only) thread in actual priority 3 blocks (semaphore, timeout, I/O, etc); the (one and only) thread in actual priority 3 calls a Change_Priority function; the (one and only) thread in actual priority 3 calls a terminate function; the (one and only) thread in actual priority 3 calls a Establish_Task function; the (one and only) thread in actual priority 3 calls an Enable_Interrupts or Enable_Task_Scheduling function; the (one and only) thread in actual priority 3 calls any other potentially priority-changing functions not listed above.

In one or more example embodiments, a thread selection algorithm also runs (at actual priority 4, to select a thread) whenever one of the blocked tasks in actual priority 4 awakens.

The thread selection algorithm can be non-reentrant and protected from multiple simultaneous thread entries by a critical region guard.

When running at actual priority 4, the thread selection algorithm runs in the thread of the actual priority 4 thread. When running at actual priority 3, the thread selection algorithm runs in the thread of the actual priority 3 thread. When running at actual priority 2, the thread selection algorithm runs in its own scheduler thread.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "receive" and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for managing a plurality of threads, the method comprising:

providing an environment associated with an operating system to execute one or more threads of the plurality of threads, the environment comprising a plurality of virtual priorities and a plurality of actual priorities, wherein each of the plurality of threads selects a virtual priority of the plurality of virtual priorities to be assigned, wherein the plurality of virtual priorities comprises a broader range of values than the plurality of actual priorities;

assigning, by the operating system, the plurality of virtual priorities to the plurality of threads;
associating an actual priority of the plurality of actual priorities to one of the plurality of threads based on the plurality of virtual priorities assigned to the plurality of threads; and
executing the one of the plurality of threads associated with the actual priority.

2. The method of claim 1, wherein associating the actual priority comprises:
identifying a thread of the plurality of threads with a highest virtual priority; and
associating the actual priority to the thread with the highest virtual priority.

3. The method of claim 1, wherein the actual priority is an actual priority 3, and wherein the plurality of threads comprises a scheduler thread, the method further comprising:
associating the scheduler thread with an actual priority 2, wherein the scheduler thread controls associating the plurality of actual priorities with the plurality of threads.

4. The method of claim 3, further comprising:
responsive to the actual priority 3 being unassociated, executing a thread selection algorithm.

5. The method of claim 3, further comprising:
calling, by the executed thread associated with the actual priority 3, a thread selection algorithm.

6. The method of claim 1, wherein the actual priority is an actual priority 3, further comprising:
associating one or more specified threads of the plurality of threads with an actual priority 4, wherein the one or more specified threads are blocked from execution during an input or output function.

7. The method of claim 6, further comprising:
responsive to completion of the input or output function, executing a thread selection algorithm.

8. The method of claim 1, wherein the executed thread calls an inhibit interrupts function or an inhibit task scheduling function.

9. The method of claim 1, wherein the executed thread calls an enable interrupts function or an enable task scheduling function.

10. The method of claim 1, wherein the actual priority is an actual priority 3, further comprising:
responsive to a termination of the executed thread, associating the executed thread with an actual priority 1.

11. An apparatus comprising:
at least one memory configured to store a plurality of threads; and
processing circuitry configured to:
provide an environment associated with an operating system to execute one or more threads of the plurality of threads, the environment comprising a plurality of virtual priorities and a plurality of actual priorities, wherein each of the plurality of threads is configured to select a virtual priority of the plurality of virtual priorities to be assigned, wherein the plurality of virtual priorities comprises a broader range of values than the plurality of actual priorities;
assign, by the operating system, the plurality of virtual priorities to the plurality of threads;
associate an actual priority of the plurality of actual priorities to one of the plurality of threads based on the plurality of virtual priorities assigned to the plurality of threads; and
execute the one of the plurality of threads associated with the actual priority.

12. The apparatus of claim 11, wherein, to associate the actual priority to the one of the plurality of threads, the processing circuitry is configured to:
identify a thread of the plurality of threads with a highest virtual priority; and
associate the actual priority to the thread with the highest virtual priority.

13. The apparatus of claim 11, wherein:
the actual priority is an actual priority 3,
the plurality of threads comprises a scheduler thread,
the processing circuitry is further configured to associate the scheduler thread with an actual priority 2, and
the scheduler thread is configured to control associating the plurality of actual priorities with the plurality of threads.

14. The apparatus of claim 13, wherein the processing circuitry is further configured, responsive to the actual priority 3 being unassociated, to execute a thread selection algorithm.

15. The apparatus of claim 13, wherein the processing circuitry is further configured to call, by the executed thread associated with the actual priority 3, a thread selection algorithm.

16. The apparatus of claim 11, wherein:
the actual priority is an actual priority 3,
the processing circuitry is further configured to associate one or more specified threads of the plurality of threads with an actual priority 4, and
the one or more specified threads are blocked from execution during an input or output function.

17. The apparatus of claim 16, wherein the processing circuitry is further configured, responsive to completion of the input or output function, to execute a thread selection algorithm.

18. The apparatus of claim 11, wherein the executed thread calls an inhibit interrupts function or an inhibit task scheduling function.

19. The apparatus of claim 11, wherein the executed thread calls an enable interrupts function or an enable task scheduling function.

20. The apparatus of claim 11, wherein:
the actual priority is an actual priority 3, and
the processing circuitry is further configured, responsive to a termination of the executed thread, to associate the executed thread with an actual priority 1.

* * * * *